C. A. AGREN.
Portable Cameras.
No. 148,019. Patented March 3, 1874.
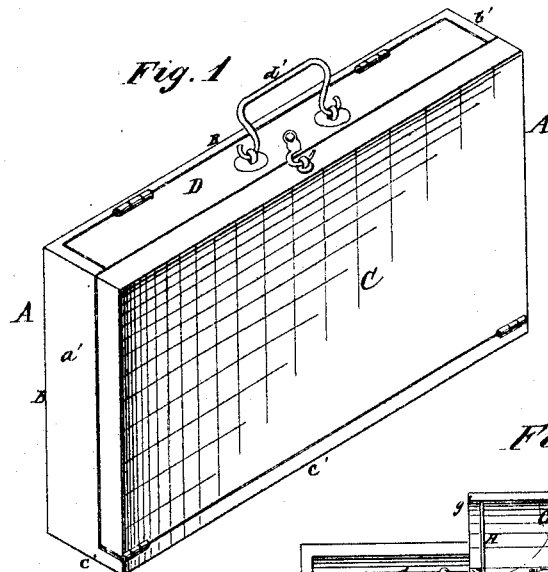
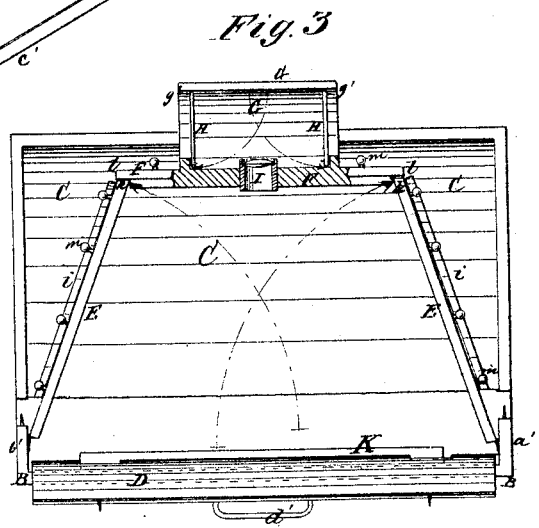
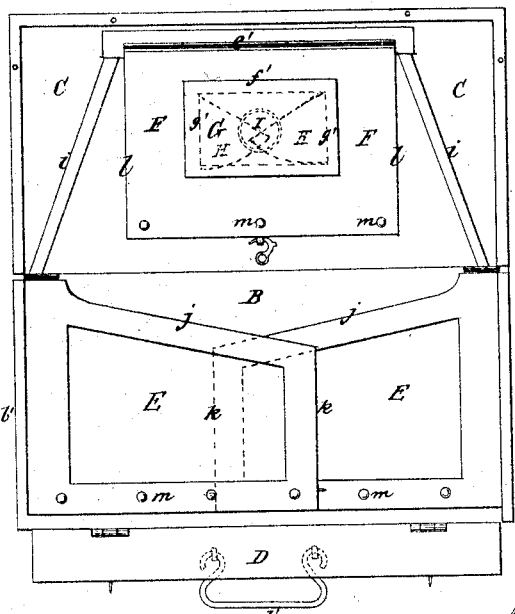
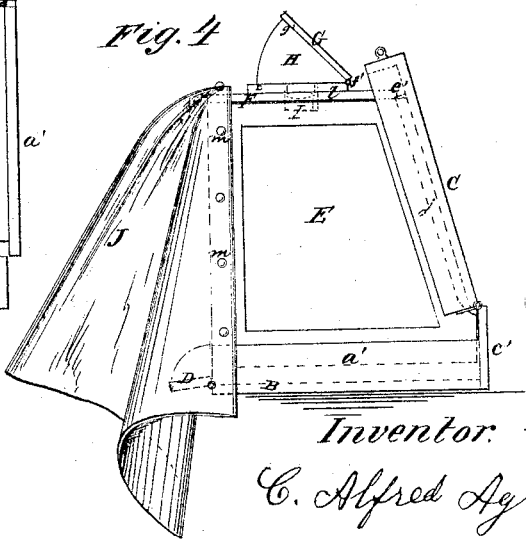
Witnesses
Sidney Kopman
Rufus Wm Harg
Inventor:
C. Alfred Agren

UNITED STATES PATENT OFFICE.

C. ALFRED AGREN, OF NEW YORK, N. Y.

IMPROVEMENT IN PORTABLE CAMERAS.

Specification forming part of Letters Patent No. 148,019, dated March 3, 1874; application filed August 26, 1873.

*To all whom it may concern:*

Be it known that I, C. ALFRED AGREN, of the city, county, and State of New York, have invented a *Camera Obscura*, of which the following is a specification:

My invention relates to that class of *camera obscura* in which the image of any object is reflected from the surface of an inclined mirror through a lens onto a drawing-board in the darkened interior of the camera, where, by tracing on a paper the outline of the reflected image, a true copy of the object may be obtained. The object of the invention is to produce an easily-portable *camera obscura*, which, when not in use, may be folded up into a small compass, yet large enough to contain at the same time all the necessary drawing materials. The invention consists in a portable folding camera, constructed as hereinafter described.

In the accompanying drawing, Figure 1 is a perspective view of the said camera folded in the shape of a box and in position for carrying. Fig. 2 is a plan view of the said box opened preparatory to the putting up of the instrument for use. Fig. 3 is a front view, partly in section, of the same when ready for use, with the exception of the front curtain. Fig. 4 is a side view of the camera ready for use.

Similar letters of reference indicate like parts.

A is the box or camera folded, which, in being put up for use, is placed so that B becomes the bottom or lower part of A; a' b', its sides; c', its back; C, its lid, hinged to the back c', and D its front lid, hinged to the bottom B. D is provided with a handle, d', for carrying the camera when folded. In Fig. 2 the lids C and D are thrown open. To the sides a' b' are hinged the side pieces E E, one as much higher than the other as its thickness, so that, when folded down, as in Fig. 2, they will lie horizontal, space enough, however, being left between the lowest of them and the bottom B to hold the drawing-board K and other necessary materials. To the lid C is hinged, at e', the top or cover F of the camera proper. Onto this cover F is hinged, at f', the mirror G, to the lower side of which latter is hinged, at each end g', the triangular side pieces H for the mirror G. These pieces H are so shaped that, when turned in an upright position, they will give to the mirror G an elevation of about forty-five degrees. In the center of the cover F, and directly underneath the mirror G, is inserted the lens I, of proper focus to throw the image on the drawing-board placed on the bottom B of the camera. i' i' are ribs fastened to the lid C to hold the side pieces E E of the camera in position.

In putting up the camera for use, raise the pieces E, the cover F, and the lid C from the position shown in Fig. 2 to that shown in Figs. 3 and 4, or so that the edges j of the pieces E will lodge against the lid C inside of the ribs i' i', and the edges l l of the cover F will rest on and against the thin upper edges k k of the side pieces E. B will then form the bottom, E E the sides, C the back, and F the top, of the camera. Now raise the mirror G, and turn down its side pieces H in an upright position; then attach the front curtain J on the buttons m m, and the apparatus is ready for use.

The motion in changing E and H from the folded to the upright position, is indicated by arrows in Fig. 3. The curtain J, when not in use, is folded together and placed inside the box A on the drawing-board K.

Having thus described my invention, what I claim as new, and desire to secure by Letters Patent, is—

As a new article of manufacture, a portable folding camera, or the box A, so constructed and provided with the pieces E F G H, variously hinged to the interior thereof, that, by opening the same, it may be transposed into a *camera obscura*, in which B and C will constitute its bottom and back, E E its sides, F and G its top and reflecting-mirror, substantially as herein shown and described, and for the purpose set forth.

C. ALFRED AGREN.

Witnesses:
SIDNEY KOPMAN,
RUFUS K. McHARG.